Feb. 3, 1959    R. H. WEILAND    2,872,120
THERMOSTATIC FLOW CONTROL UNIT
Filed Dec. 21, 1955
FIG. 1
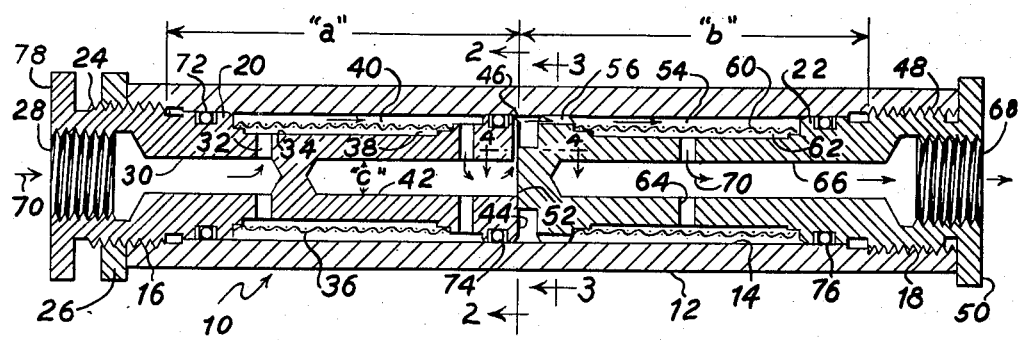
FIG. 2    FIG. 3    FIG. 4
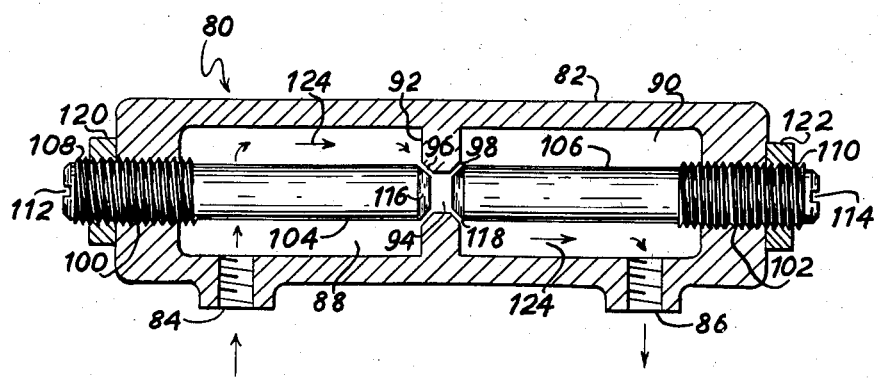
FIG. 5
INVENTOR.
RICHARD H. WEILAND
BY Hubert Miller
ATTORNEY United States Patent Office 2,872,120
Patented Feb. 3, 1959

2,872,120

THERMOSTATIC FLOW CONTROL UNIT

Richard H. Weiland, Wichita, Kans., assignor to Boeing Airplane Company, Wichita, Kans., a corporation of Delaware Application December 21, 1955, Serial No. 554,538

4 Claims. (Cl. 236—93)

This invention relates in general to a control device for hydraulic systems, and pertains more particularly to an orifice flow control unit for limiting flow through the system in accordance with temperature changes of the fluid passing through the control unit.

While my invention will find use in a variety of hydraulic environments, it may be explained at the outset that it has especial utility when installed on supersonic high-altitude aircraft. On this type of craft, even during what are only routine flights, extreme temperature changes are constantly experienced and these changes occur very quickly. Such temperature fluctuations, largely due to atmospheric changes, and their frequency of occurrence introduce a serious problem, for these changes are accompanied by corresponding changes in the viscosity of the oil. Employment of an orifice having fixed dimensions permits too great a flow rate when the oil temperature is high and causes far too slow a rate when the oil temperature is low.

Accordingly, the primary object of this invention is to provide an orifice flow control unit in which the orifice automatically compensates for temperature changes, providing a substantially constant oil flow rate through the system regardless of oil temperature. Of course it is to be understood that the oil temperature may change due to causes other than atmospheric temperature changes. For instance, various operating conditions, such as the heating up of the oil from friction, may influence the temperature of the oil. However, the control unit hereinafter described in detail automatically adjusts in response to these other modifying factors as well as for atmospheric temperature changes.

Another object of the invention is to provide a thermostatic flow control unit that is devoid of complicated mechanisms, being instead of very simple construction and capable of reliably withstanding gravitational forces having a magnitude many times normal, as would be the situation during dive pull outs and to a certain extent during barrel rolls.

A further object of the invention is to provide a control unit of the above-described character which is susceptible to facile adjustment for preferred flow rates either at the factory or in the field as circumstances might dictate.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

Figure 1 is a longitudinal sectional view through the center of my thermostatic flow control unit;

Figure 2 is a view taken in the direction of line 2—2 of Figure 1, the view being at such a locus that only the housing is in section;

Figure 3 is a sectional view taken in the direction of line 3—3 of Figure 1;

Figure 4 is a sectional detail taken in the direction of line 4—4 of Figure 1, the view helping to clarify pictorially the orifice construction also appearing in Figure 2, and Figure 5 is a longitudinal sectional view illustrating another embodiment that the invention is intended to embrace.

Referring now in detail to the drawing the embodiment depicted in Figures 1-4 is designated in its entirety by the numeral 10. The thermostatic flow control unit 10 comprises a tubular housing or barrel 12 having a generally cylindrical bore 14 extending completely therethrough. As indicated by the numerals 16 and 18, each end of the barrel 12 is internally threaded for the reception of a pair of inserts 20 and 22, respectively.

Describing the left hand insert 20, it is to be observed that it is anchored to the barrel 12 only in the region of the threads 16, the insert being externally threaded at 24 for this purpose. The threaded connection between the insert 20 and the barrel 12 permits easy axial adjustment of the insert for a purpose later explained. Engaged with the threads 24 is a lock nut 26, this lock nut serving as the means by which the adjustment may be maintained fast.

The insert 20 is counterbored at 28 and this counterbore is threaded for the accommodation of a threaded fitting (not shown) forming a part of the hydraulic system into which the unit 10 is to be installed. A bore 30, the axial continuation of the counterbore 28 extends inwardly into communication with a pair of radially projecting apertures 32, the bore 30 being bottomed just beyond these apertures.

The diameter of the insert 20 is of reduced dimensions in the general region designated by the numeral 34 and circumscribed about this reduced diameter or necked portion is a filter screen 36. The neck 34 is actually small enough in diameter so as to leave an annular passage 38 between the insert 20 and the screen 36 and another annular passage 40 between the screen and the internal wall of the barrel 10. Consequently, all fluid passing through the apertures 32 passes through the filter screen 36.

Having passed through the screen 36, the fluid is directed centrally into a second axial bore 42 through which it proceeds to the inner end 44 of the insert 20. Once again the flow is directed radially, but this time via an orifice having a rectangular configuration 46, the end portion of the insert 20 forming three walls of this orifice. It is intended that the flow be confined to this orifice 42 at only one temperature as will hereinafter become apparent.

Before referring to the continuation of the oil path, it is best to explain first that the insert 22 is equipped with outer threads 48 which engage the threads 18 corresponding to the threads 16 so as to anchor the insert 22 to the barrel 12 only in this region. The extent of inward advancement of the insert 22 is limited by a flange or hexagonal head 50, this flange bearing against the right end of the barrel. Once having screwed the insert 22 in as far as possible, then the inner end 52 of this insert serves as the means for limiting the extent that the insert 20 can be screwed inwardly from the opposite end of the barrel.

With the foregoing explanation in mind it can be seen that the end 52 of the insert 22 forms the fourth wall (at an elevated fluid temperature) for the orifice 46 when the two ends 44 and 52 are abutting each other. More will be said hereinafter as to how the dimensions of the orifice can in effect be expanded or increased. However, Figure 4 illustrates the minimum size that the orifice 46 can assume. Thus, it is impossible to cut off completely the flow of oil through the unit 10.

After emergence from the orifice 46 the flow path is via an annular passage 54 formed by the insert 22 and the inner wall of the barrel 12. In order to support the inner end 52 of the insert 22 in a slidable manner a plurality of circumferentially disposed segments 56 is employed, intermediate spaces 58 being milled therebetween so that the oil may progress through this passage 54.

As in the case of the insert 20 a filter screen 60 is employed through which the fluid must flow as a double precaution against foreign matter moving beyond the unit 10. Also, the filters 36 and 60 prevent such foreign matter from fouling up the contraction and expansion of the inserts. Further, employment of two filters renders the unit bi-directional as to its flow. Actually, the insert 22 is of sufficiently reduced diameter so as to provide the necessary clearance to form the annular passage 54 and a passage 62 innerjacent the screen 60.

From the innerjacent passage 62 the oil is led centrally through radial apertures 64 into an axial bore 66. No need exists for further diversion of the oil so the bore 66 communicates directly with a threaded counterbore designated by the numeral 68. The counterbore 68 in turn can be threadedly connected to a second fitting (not shown) belonging to the hydraulic system.

From the foregoing it is believed that the direction of flow through the entire unit 10 can readily be comprehended. As an aid to this understanding a sequence of arrows labeled 70 provides a facile way of tracing the oil path. It might be explained that the oil is effectively confined to this somewhat tortuous path by suitable seals such as the O rings disposed in annular grooves at the several locations 72, 74 and 76. The O rings 72 and 74 of course are associated with the insert 20, whereas the O ring 76 is associated with the insert 22.

Up to this point nothing has been said concerning the materials to be used in fabricating the barrel 12 and the inserts 20, 22. While a variety of materials may be selected, selection of materials will be governed by their respective linear coefficients of thermal expansion. Metals that are deemed satisfactory are steel for the barrel 12 and aluminum for the two inserts 20, 22. For the sake of discussion we will assume that the steel we have selected possesses a linear coefficient of expansion having a mean value of 0.00000636 inch/° F., whereas aluminum has a coefficient of thermal expansion of 0.00001234 inch/° F., thereby giving a difference in expansion of 0.00000598 inch/° F.

Since actual dimensions play an important part in deriving a thermostatic flow control unit having practical utility for a given task, certain letter characteristics have been applied to Figures 1, 2 and 4. In this regard the letter "a" represents the free or inwardly projecting length of the insert 20 beyond its anchored locus, and the letter "b" represents the corresponding free length of the insert 22. Further, the letter "c" has been used to designate the diameter of the bore 42. Also the letter "x" has been employed for one cross-sectional dimension of the orifice 46 and "y" for the other.

Therefore, if we assume that flight operations will encounter a change of temperature from 70° F. to (—)65° F. this makes a difference of 135° F. If we further assume that the dimension "a" and the dimension "b" are both 3 inches, making a combined total of 6 inches, then the product of 0.00000598 by 135 by 6 equals 0.00485 inch. This is the net difference between the contraction of both inserts 20, 22 with respect to the barrel 12 when the temperature of the oil has gone from 70° F. to (—)65° F.

If the ends 44 and 52 of the inserts 20, 22 are just touching at 70° F. and the "x" and "y" dimensions of the orifice 46 are each 0.060 inch then the cross-sectional area of the orifice at this temperature is 0.0036 square inch. However, if the ends 44 and 52 are just touching at 70° F. they will of course be separated somewhat at (—)65° F. Consequently, not only will there be the original area of 0.0036 square inch but there will be the additional area resulting from such contraction. This additional area can be figured by ascertaining the circumference of the bore 42 which is "c" multiplied by 3.1416 and since "c" equals 0.250 inch this product is 0.7854 inch. Since the separation of the ends 44, 52 equals 0.00485 inch as above determined, then the increase in area is 0.0038 square inch. Added to the original orifice area the total cross-sectional area available to the oil in this region becomes 0.0074 square inch. Stated very succinctly, the rectangular area bounded by the dimensions "x" and "y" is augmented by an area "ring" which exists by virtue of the separation of the insert ends 44, 52. Thus while the original orifice area still remains available, it is supplemented by the aforementioned area ring. Since the oil is more viscous at the lower temperature (that is at minus 65° F.), the oil requires a greater opening through which to flow if the rate of oil flow is to remain virtually unchanged. This is automatically provided with the unit 10. Of course, the opening available is less for temperatures encountered above the illustrative (—)65° F., graduating downwardly in size to only the orifice 46 at the more elevated 70° F. figure.

At this time a word is believed in order concerning the adjustment of the control unit. In this regard it will be recalled that the insert 22 is advanced into the barrel 12 by turning the hexagonal flange 50 until it abuts or shoulders against the right end of said barrel. This course of action of course determines the location of the end 52. The insert 20 is likewise equipped with a similar hexagonal flange 78 and permits advancement of this insert inwardly in the direction of the insert 22. If the orifice 46 has been properly dimensioned for the type of fluid to be controlled by the unit and the highest fluid temperature to be encountered is known, then the insert 20 can be moved inwardly until its end 44 engages the end 52 of the insert 22. On the other hand it is not entirely necessary that such data be precisely known, for the insert 20 can be adjusted so that at whatever turns out to be the highest operating temperature the ends 44 and 52 will be spaced apart to accommodate the fluid flow, such spacing, together with the original orifice opening, giving the desired overall cross-sectional area for properly governing the flow rate. Contraction of the inserts for cooler temperatures will of course increase this overall cross-sectional area.

For some installations a more simplified version of the unit 10 may suffice. Accordingly, attention is now drawn to the modification pictured in Figure 5. This thermostatic control unit has been indicated generally by the numeral 80 and includes a housing or barrel 82 provided with a threaded inlet opening 84 and a threaded outlet opening 86, these openings communicating respectively with compartments 88 and 90. The barrel 80 also includes a partition wall 92 intermediate the compartments 88, 90. This wall is apertured at 94 and the aperture is formed with beveled seats 96, 98 at either end.

Each end of the barrel 82 has a threaded aperture 100, 102 for the accommodation of inserts 104 and 106 in the form of cylindrical rods or bars. These rods 104, 106 are threaded at 108 and 110, respectively, and by means of transverse slots 112, 114 each may be advanced into the barrel 82 so as to cause their complementally beveled ends 116, 118 to approach the beveled seats 96, 98. Lock nuts 120, 122 when tightened are employed to hold the insert rods 104, 106 in a preferentially adjusted position.

Here again, sequential arrows 124 have been used in indicating the flow path through the unit 80. Also, we will again assume that the barrel 82 is constructed of steel, whereas the inserts 104, 106 are of aluminum. However, it is the relative thermal expansion that we are concerned with and other materials can be used if found practical for the particular operational requirements to be encountered.

In operation, the aluminum inserts 104, 106 will be set for a particular spacing at one temperature and will contract or expand for deviations from that temperature. For instance, the rods 104, 106 might be adjusted axially relative to their seats 96, 98 so that a preferred orifice opening is obtained at, say 70° F., this opening then being comparatively small. If the temperature of the oil flowing through the unit 80 later drops to (—)65° F. then the rods will contract to increase the opening.

While no filter screens are depicted in Figure 5 it will be appreciated that provision can be made for mounting such screens within the compartments 88, 90 concentrically with the insert rods, or if preferred filters may be employed externally of the unit 80.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A thermostatic flow control unit comprising a tubular barrel having a relatively low coefficient of thermal expansion, a pair of members extending into said barrel from either end having a relatively high coefficient of expansion, the adjacent inner ends of said members being opposed to each other for relative movement toward and away from each other and the remote outer ends thereof being anchored to the opposite ends of said barrel, each of said members having an axial bore leading inwardly from its outer end to an intermediate radial passage in communication with a centrally offset passage provided between said barrel and each member, one of said members having another radial passage near its inner end leading into another axial bore extending from said inner end toward the first mentioned bore of that member, and packing means disposed between said other radial passage and the inner end of said one member, that offset passage between the other of said members and the barrel continuing inwardly to the region of said inner ends and one of said inner ends having a radial slot leading from said last mentioned passage centrally into communication with said other bore, the flow path continuing via the centrally offset passage between the barrel and the second member to the bore of said second member, said barrel having a lower coefficient of thermal expansion than said pair of members.

2. A thermostatic flow control unit in accordance with claim 1 including filter elements inserted in each of said centrally offset passages.

3. A thermostatic flow control unit comprising: an elongated tubular housing of a material having a relatively low coefficient of expansion; a first elongated valve member having one of its ends threadedly secured to and sealed within one end of the housing and its remaining portion projecting into the interior of the housing, the housed portion of the valve member being smaller in diameter than the bore of the housing and defining therewith an elongated annular fluid flow path; a blind bore in said first valve member extending from the outer end thereof to a point near its inner end; ports through the wall of said first valve member affording communication between the blind bore and the annular fluid flow path, said valve member being made of a material having a relatively high coefficient of expansion; a second elongated valve member also of a material having a relatively high coefficient of expansion having one of its ends threadedly secured to and sealed within the other end of said housing, the remaining portion of said second valve member also projecting into the interior of the housing to a point immediately adjacent the housed end of the first valve member, the housed portion of said second valve member also being smaller in diameter than the bore in the housing and defining therewith an elongated annular fluid flow path; two blind bores in said second valve member extending respectively from the opposite ends thereof to a point near the longitudinal center thereof; ports through the wall of the second valve member affording open communication between the blind bore in its outer end and the said annular flow path; ports through the wall of the second valve member affording open communication between the blind bore in its inner end and said annular flow path; means sealing between the inner end of the second valve member and the adjacent bore wall of the housing to direct the flow of fluid through the blind bore in the housed end of the second valve member, the extreme and immediately adjacent inner ends of the two valve members cooperating as valve head and valve seat to regulate the flow of fluid from one to the other in accordance with the degree of elongation or contraction of the members resulting from changes in temperature of the fluid flowing therethrough.

4. The flow control unit described in claim 3 and separate means carried respectively by the housed portions of said valve members for filtering fluid flowing through one to the other.

References Cited in the file of this patent

UNITED STATES PATENTS

| | | |
|---|---|---|
| 593,595 | Marsh | Nov. 16, 1897 |
| 719,568 | Conley | Feb. 3, 1903 |
| 966,096 | Holmes | Aug. 2, 1910 |
| 1,443,601 | Udale | Jan. 30, 1923 |
| 1,850,963 | Sponar | Mar. 22, 1932 |
| 1,924,372 | Peteler | Aug. 29, 1933 |
| 2,513,720 | Hallinan | July 4, 1950 |